(No Model.) 2 Sheets—Sheet 1.

W. T. BATE.
GAS FURNACE.

No. 499,157. Patented June 6, 1893.

Witnesses:
E. J. Koerth.
D. B. Gallatin.

Wm. T. Bate
Inventor.
By Chas. E. Barber
Attorney (No Model.) 2 Sheets—Sheet 2.
W. T. BATE.
GAS FURNACE.
No. 499,157. Patented June 6, 1893.
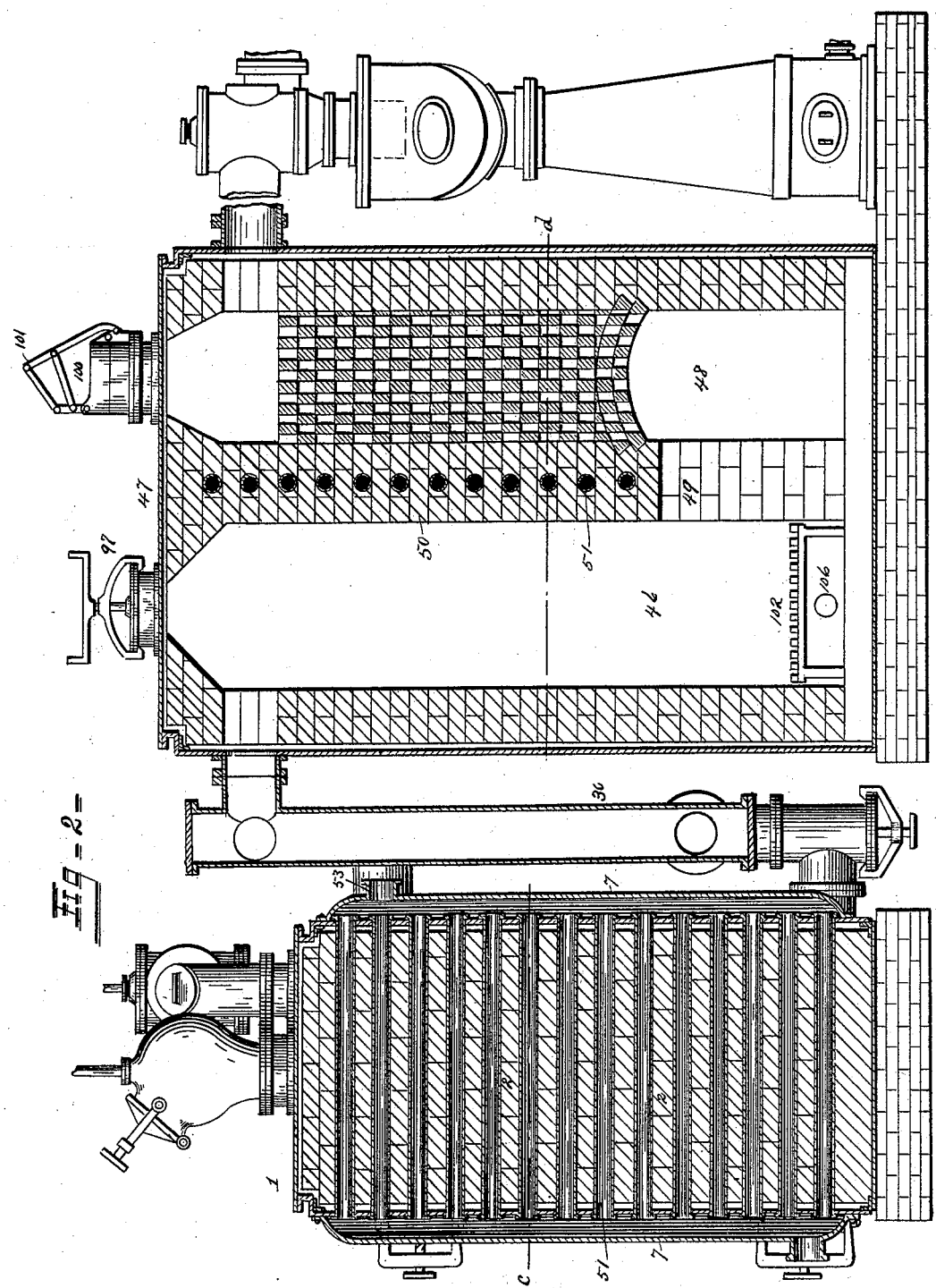
Witnesses
H. J. Koerth.
D. B. Gallatin.
W<sup>m</sup>. T. Bate Inventor
By Chas. E. Barber
His Atty.

UNITED STATES PATENT OFFICE.

WILLIAM T. BATE, OF CONSHOHOCKEN, PENNSYLVANIA.

GAS-FURNACE.

SPECIFICATION forming part of Letters Patent No. 499,157, dated June 6, 1893.

Application filed October 23, 1891. Serial No. 409,627. (No model.)

*To all whom it may concern:*

Be it known that I, WILLIAM T. BATE, a citizen of the United States, residing at Conshohocken, in the county of Montgomery and State of Pennsylvania, have invented certain new and useful Improvements in Gas-Furnaces, of which the following is a full and complete description, sufficient to enable others skilled in the art to understand and use the same.

My present invention relates particularly to the producing furnace and to the converting or fixing chambers, and has for its object to provide means for cheaply and economically heating air to be used in gas making or for metallurgical purposes, and incidentally to protect the furnaces by passing through the walls thereof volumes of air to be heated whereby heat is absorbed and carried off and the walls are protected and prevented from being damaged by overheating.

To these ends the invention consists in forming in the walls of the producing or converting furnaces or in the partitions between the chambers thereof, air-passages or flues through which air is forced from the outside to be heated, as will be hereinafter fully described.

Figure 1:
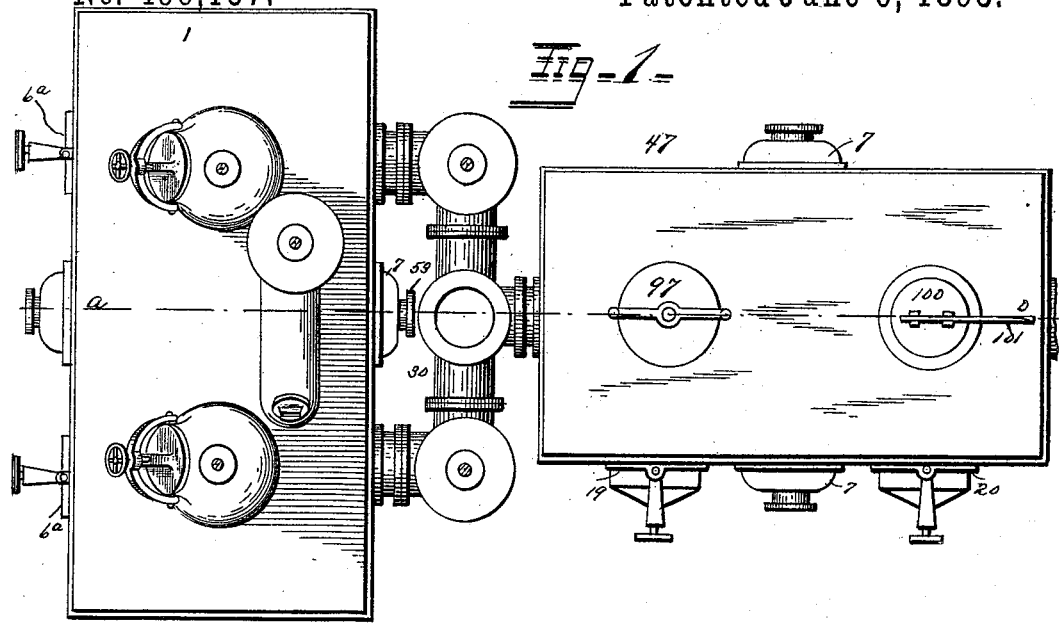
Figure 3:
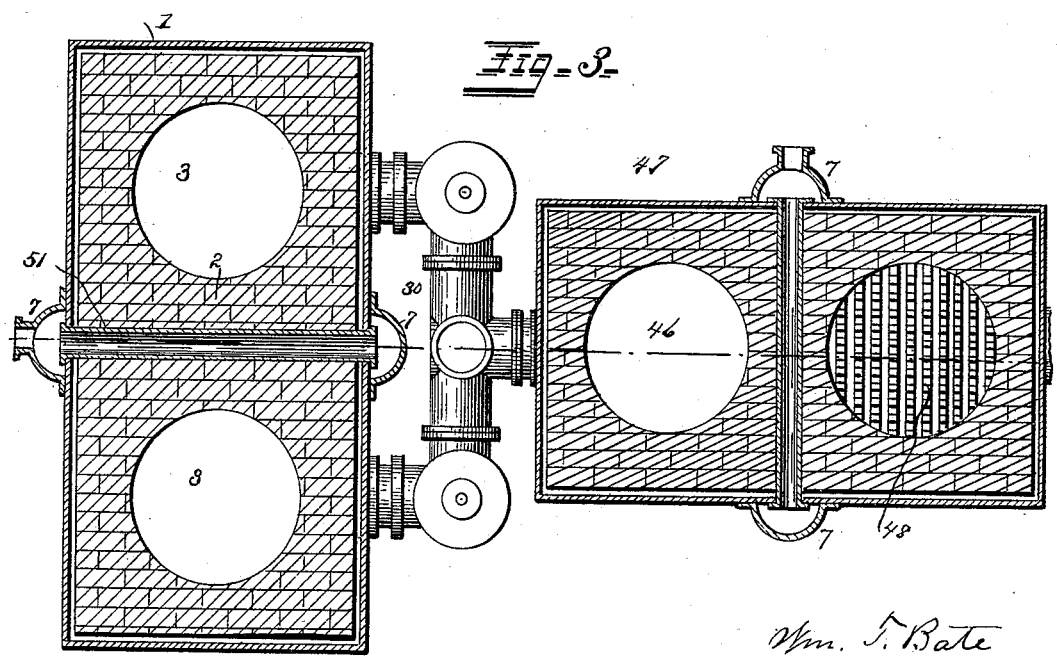

In the accompanying drawings which illustrate my invention and form a part of this specification, Figure 1 represents a plan view of the producer and converter, with the pipe connection between the same. Fig. 2 represents a vertical section on the line *a—b*, in Figs. 1 and 3; and Fig. 3 is a horizontal section on the plane indicated by the broken line *c—d*, in Fig. 2.

1 designates the gas-producer which comprises twin-chambers, 3, 3, separated by a dividing wall or partition, 2, each of which chambers is provided with a grate, and with a door, 6ª, opposite the grate for the withdrawal of non-combustible residue, with openings near the top for the introduction of gas-producing materials, and with suitable valves for controlling the escape of gas.

47 designates the purifier, which also comprises two chambers or compartments, 46, 48, divided by a partition wall, 50, in the lower part of which is an arched opening, 49, which forms a communicating passage between the two chambers through which the gas passes from the chamber 46 into the chamber 48.

The producing furnaces and the purifier are connected at their upper parts by a system of valved pipes, 30, through which the gas passes from the converter, the construction and operation of which valved pipes are fully set forth in my application above referred to.

The chamber 46 is provided with a grate, 102, for the reception of coke, with a door, 19 opposite the grate for the withdrawal of ashes, cinders, &c., with an opening at the top which is closed by a plate and retort fastening, 97, and with tuyere opening, 106, below the grate. The chamber 48, is also provided at the bottom with a door 20 through which it is cleaned out, with an outlet passage near the top by which it is connected with the washer, and with an opening in the top closed by a valve, 100, which is operated by a lever, 101.

As above indicated the subject matter of the present application comprehends a construction of the producing and converting furnaces whereby provision is made for utilizing the waste heat of the furnaces for heating air to be used in the manufacture of gas, or for other purposes, such as general heating, metallurgical operations, &c., and whereby the surplus heat is abstracted and drawn off from the walls of the furnaces and the latter protected from damage by overheating. In the partition wall, 2, between the producing chambers 3, 3, and in the partition, 50, between the converting and fixing chambers, 46, 48, are horizontal pipes or flues, 51, arranged in vertical series, as shown in Fig. 1, through which flues, the air to be heated is passed and which in its passage absorbs and carries off the surplus heat from the walls, the heated air drawn off being replaced by cold air drawn in from the outside, whereby the wall is kept comparatively cool and is prevented from being overheated and damaged. The pipes 51 are flanged at their ends, so as to bind and hold the walls and thereby strengthen.

Each horizontal flue is connected at both ends with D-shaped vertical pipes or flues, 7, one having an inlet near the bottom and the opposite one having an outlet near the top.

The flues, 51, extend entirely through the outer walls of the furnaces, and are connected outside of the same with the vertical flues or air passages 7 between the inlets and the outlets. Pipes, 53 are connected with the outlets for conveying the heated air to the point or structure where it is to be used, and when more than a natural draft is required, fans or blowers (not shown) may be applied to the inlets and the circulation thereby accelerated.

The air may be passed through the heating flues in either direction, especially when forced by a fan or blower, but in order to utilize the buoyancy of the heated air in producing a natural draft, the cold air should be admitted at the bottom and the heated air drawn off at the top.

The operation of my invention will be readily understood in connection with the above description and is as follows: The cold air entering at the bottom of the flues passes through the same and upward to the exit, from which it may be conducted by means of pipes to the place where it is to be used, either as a blast or for heating purposes. These flues, being made of metal, have the additional advantage of strengthening the furnace walls and rendering them more durable. Also, while I show and describe my invention in connection with a gas furnace, it is to be understood that it is applicable to furnaces generally without regard to their use or purpose.

Having now described my invention, I claim—

1. In a gas producing furnace embracing a generating and firing chamber, the combination with the partition wall thereof, of the air flues consisting of metallic pipes embedded in the walls, the said pipes being flanged at the ends which embrace the outer walls of the furnace, to strengthen and hold the same, substantially as specified.

2. The combination with the metallic flues embedded in and extending through the walls of the furnace, of the vertical D-shaped flues having their open sides communicating with the open ends of the air flues, and provided with inlet and outlet air passages, substantially as specified.

In testimony whereof I affix my signature in the presence of two witnesses.

WILLIAM T. BATE.

Witnesses:
T. H. BROOKE,
CHARLES E. BARBER.